A. E. RASMUSSEN.
VALVE.
APPLICATION FILED JULY 13, 1917.

1,272,998.

Patented July 16, 1918.

WITNESSES

INVENTOR
A. E. Rasmussen
BY
ATTORNEYS

UNITED STATES PATENT OFFICE.

ALBERT EDWARD RASMUSSEN, OF NORTH YAKIMA, WASHINGTON.

VALVE.

1,272,998.  Specification of Letters Patent.  Patented July 16, 1918.

Application filed July 13, 1917. Serial No. 180,336.

*To all whom it may concern:*

Be it known that I, ALBERT E. RASMUSSEN, a citizen of the United States, and a resident of North Yakima, in the county of Yakima and State of Washington, have invented a new and Improved Valve, of which the following is a full, clear, and exact description.

My invention relates to valves for closing or opening a surface opening on a conduit and is particularly adaptable to irrigation conduits.

An object of the invention is to provide a simple and inexpensive valve which can be easily and quickly applied and operated on pipe lines in irrigation systems.

A further object of the invention is to provide a valve for controlling an aperture on the surface of a conduit so that the size of the orifice may be varied to obtain the desired outflow.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 1:
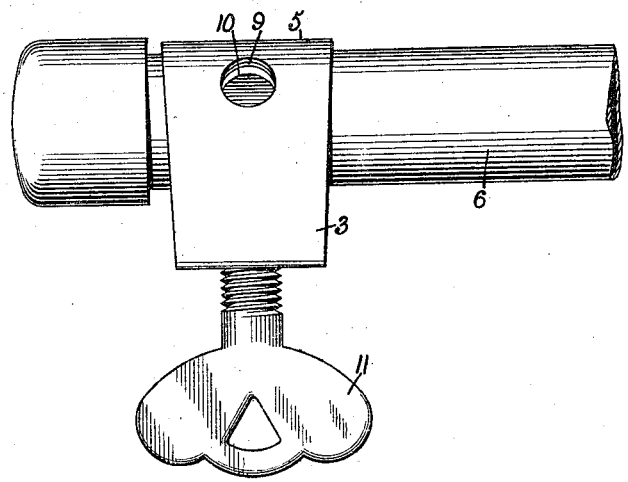
Figure 2:
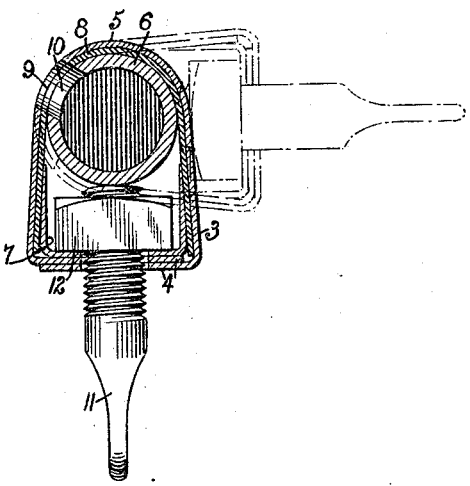

Figure 1 is a side elevation of a conduit provided with a valve embodying my invention; and Fig. 2 is a cross section through the conduit and valve, the dotted line in said figure of the valve showing the valve in closed position.

Referring to the drawings, 3 is an iron band shaped into a stirrup, the flat part of which is formed where the ends 4 of the band overlap. The rounded part 5 of the stirrup has a curvature corresponding to the size of the conduit 6 which it is to straddle. The stirrup 3 is preferably wider at the flat part to accommodate a U-shaped washer 7, the bottom of which U rests on the flat part of the stirrup and the sides of which washer follow the sides of the stirrup.

A gasket 8 is interposed between the stirrup and the conduit. This gasket extends along the sides of the stirrup and is retained at the sides of said stirrup by the sides of the washer 7. The stirrup and washer have an aperture 9 therethrough which may be registered with an aperture 10 in the conduit. See Fig. 2.

The register of the apertures 9 and 10 is maintained by a thumb screw 11 which passes through a nut 12 of angular configuration and is prevented from turning by the sides of the U-shaped washer wherein the nut is seated. In consequence when the thumb screw is forced against the conduit the stirrup is drawn tight against the conduit.

By locking the stirrup to the conduit in any position between that shown in full line and that shown in dotted line in Fig. 2, any size of delivery aperture may be obtained and thereby the outflow from the conduit 6 varied. The outflow is entirely cut off when the apertures 9 and 10 are out of register.

From the above description it will be seen that by this simple and inexpensive device I am able to control the discharge from the conduit from its maximum to its minimum with little danger of blocking the aperture formed by the valve, for the reason that at the smallest discharge the aperture is sufficiently elongated to prevent clogging.

I claim:

1. In combination with a conduit having an aperture in the side thereof, a valve comprising a stirrup straddling the conduit, a gasket between the conduit and the stirrup, said gasket and stirrup having an aperture adapted to communicate with the aperture in the conduit, a nut in the stirrup, a screw engaging the nut and adapted to engage the conduit whereby the stirrup is locked to the conduit and whereby the communication between the apertures is controlled, and means associated with the nut for locking the gasket to the stirrup.

2. In combination with a conduit having an aperture in the side thereof, a valve comprising a stirrup straddling the conduit at the aperture, a gasket in said stirrup for engaging the surface of the conduit, said stirrup and gasket having an aperture adapted to communicate with the aperture in the conduit, a U-shaped washer the sides of which engage the gasket and retain the same against the sides of the stirrup, a nut resting on said washer in the stirrup, and a thumb screw engaging the nut and adapted to engage the conduit, whereby the stirrup may be locked to the conduit and whereby the communication of the apertures in the conduit, stirrup, and washer may be controlled.

ALBERT EDWARD RASMUSSEN.

Copies of this patent may be obtained for five cents each, by addressing the "Commissioner of Patents, Washington, D. C."